March 10, 1964  W. D. HOFER  3,124,203
CULTIVATOR SHANK AND MOUNTING
Filed Aug. 24, 1961
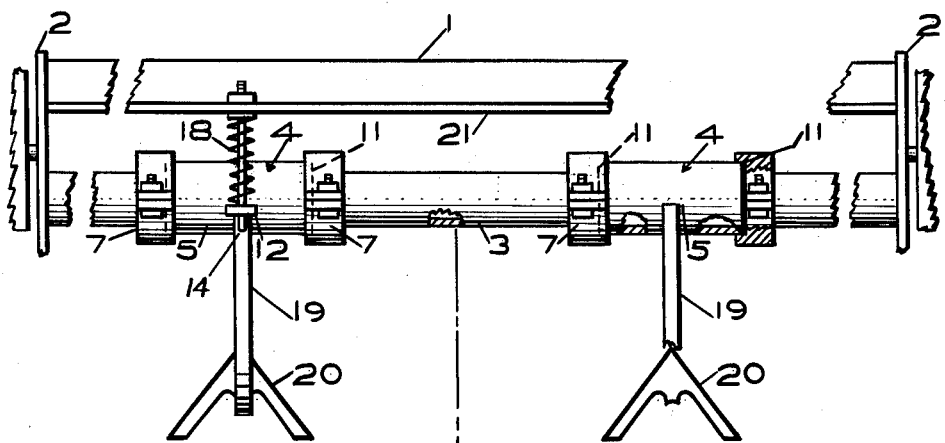
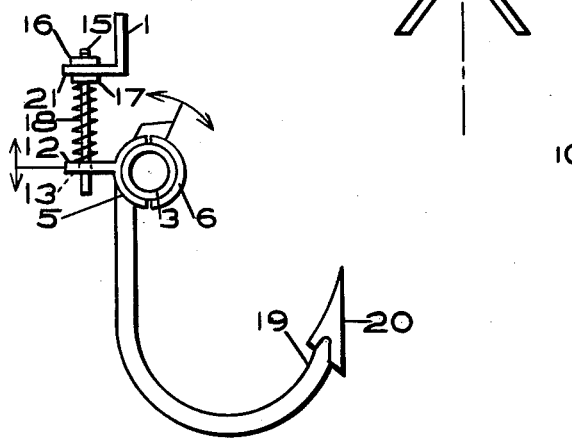
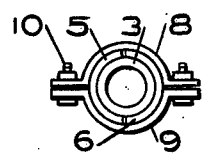

United States Patent Office 3,124,203
Patented Mar. 10, 1964

3,124,203
CULTIVATOR SHANK AND MOUNTING
Walter David Hofer, Brocket, Alberta, Canada
Filed Aug. 24, 1961, Ser. No. 133,636
1 Claim. (Cl. 172—762)

This invention relates to cultivators, having particular reference to a shank mounting by which a series of shovel carrying shanks may be mounted suspended from a cultivator cross frame bar.

In the art to which the invention relates cultivator shanks are more usually separately mounted on the cultivator frame in fixed spacing in relation to each other. Also these mountings have a tendency to permit side give on the shovels.

The present invention is concerned with an improved mounting for cultivator shanks by which the spacing of the shanks may be varied, and side give on the shovels is eliminated.

Other features and advantages of the invention will be apparent by reference to the accompanying description taken in conjunction with the drawings.

In the drawings, wherein is illustrated a preferred embodiment of the invention, FIG. 1 is a top plan view of a mounting for cultivator shanks in accordance with my invention, shown as supported from a cross frame bar, a fragment only of which is indicated, parts being shown as broken away and parts in section.

FIG. 2 is an end view of a shovel carrying shank and mounting, but with the clamps omitted.

FIG. 3 shows an end view of the frame shaft, including the shank mounting pipe and clamp.

Having reference to the drawings, 1 indicates an angle iron cross bar representing a fragment of a wheel supported frame, the cross bar attaching to end frame bars 2.

The cultivator shank mounting consists of a tubular shaft 3 to be mounted fixed to the frame end bars 2 parallel with the bar 1, and on which are attached sleeves 4, one of each cultivator shank. These sleeves each consist of mating halves 5 and 6 combining to form a cylindrical whole adapted to fit around the shaft 3. The sleeves are attached to the shaft by end clamps 7, each formed of halves 8 and 9 (FIG. 3) attached together by bolts 10. The sleeve clamps are attachable directly on the shaft 3 and include annular cut away portions 11 (FIG. 1) in which the ends of the sleeves are receivable with the sleeves free to turn in the clamps.

Fixed to the one half of each of the sleeves 4, in the present showing the upper half 5, is an upstanding radially projecting arm 12 that is endwise slotted at 13 in which is engageable a rod 14, the rod having a threaded end 15 on which are nuts 16 and 17 for attachment of the rod to the vertical wing 21 of the frame bar 1, the wing having a suitable opening through which the rod passes. On the rods 14 are coiled springs 18 interposed between the arms 12 and wing 21.

Cultivator shanks, or standards 19 are fixed, as by welding, to the sleeve halves 5, these shanks carrying shovels 20.

In the use of the device the sleeve halves 5 and 6 are attached by the end clamps to the pipe 3, the sleeves being endwise adjustable on the pipe or shaft to vary the spacing of the sleeves. These sleeves are free to turn in the clamps 7, the sleeves mounting in the cut away portions 11 of the clamps.

The sleeves attached by the arms 12 and rods 14 to the wing 21 of the frame bar 1, with the rods free to slide in the slots 13 so that if the shanks 19 are compelled to rise for the shovels 20 to avoid an obstruction the arms 12 may tilt compressing the springs 18, the amount of such tilting being limited by the length of the slots 13, for which the arms 12 and slots 13 can be made the desired length.

Since the shanks 19 are fixed to the sleeves, which in turn are held against tilting endwise on the shaft, side play of the shanks in eliminated and a straight furrow obtained.

Having thus particularly described and ascertained the nature of my said invention, what I claim and wish to secure by Letters Patent is:

In a cultivator having a frame and a tubular shaft transversely mounted therein, and including a series of shovel carrying shanks, means mounting the shanks on the tubular shaft, said means comprising for each shank a sleeve to which the upper end of the shank is integrally fixed projecting at right angles thereto, and clamps attaching the sleeve on the shaft, said clamps comprising opposing semicircular halves embracing the shaft and including bolts attaching the halves together forming an annular unit, said clamp halves having each an annular recess on the inside thereof at one end and in which an end of the sleeve is engageable, with the sleeve free to turn therein on the shaft.

References Cited in the file of this patent
UNITED STATES PATENTS

| | | |
|---|---|---|
| 1,088,767 | Bradford | Mar. 3, 1914 |
| 1,623,898 | Winnett | Apr. 5, 1927 |
| 2,679,793 | Rolf et al. | June 1, 1954 |

FOREIGN PATENTS

| | | |
|---|---|---|
| 175,736 | Great Britain | Feb. 20, 1922 |